INVENTOR
Mehmet Orhan Tarhan

United States Patent Office 3,448,039
Patented June 3, 1969

3,448,039
VAPORIZING AND PRETREATING AROMATIC HYDROCARBON FEED STOCK WITHOUT POLYMERIZATION
Mehmet Orhan Tarhan, Bethlehem, Pa., assignor to Bethlehem Steel Corporation, a corporation of Delaware
Filed July 19, 1967, Ser. No. 654,582
Int. Cl. C10g 23/06, 31/14, 37/10
U.S. Cl. 208—255                    8 Claims

ABSTRACT OF THE DISCLOSURE

In a process of eliminating polymerizable impurities in aromatic hydrocarbon feed stock, the feed stock in unpreheated liquid form is completely vaporized by admixture with a preheated gas containing hydrogen in the presence of a hydrogenation catalyst, and the resultant gaseous mixture is reacted at a specified temperature in the presence of said catalyst whereby polymerizable impurities are converted to a non-polymerizable form.

---

This invention relates to an improvement in the refining of aromatic hydrocarbons, and pertains particularly to the refining of crude light oils obtained during the carbonization of coal.

Background of the invention

Crude light oils obtained during the carbonization of coal contain principally one-ring aromatics which are associated with numerous impurities. The aromatics include benzene, toluene, xylenes, ethylbenzene and trimethylbenzenes. The impurities include paraffins, naphthenes, olefins, carbon disulfide, phenol, heterocyclic compounds such as thiophenes, pyridines and coumarone, and certain unsaturated derivatives such as styrene and indene.

A method commonly used to refine crude light oil is that by which crude feed stock is vaporized and treated with hydrogen, or hydrogen mixed with other gases, in the presence of a catalyst at elevated pressure and temperature. This type of treatment is known variously as hydrogenation, hydrodesulfurization, hydrodenitrogenation, hydrocracking, hydrofining or hydrodealkylation.

There is another type of treatment in which feedstock vapors are treated with hydrogen or a mixture of hydrogen and other gases at elevated temperature and pressure in the absence of any catalyst. This second type of treatment is known by the sundry names of thermal hydrocracking, thermal hydrodealkylation, etc.

I prefer to refer to the two types of process mentioned above, collectively, as "hydro-upgrading" processes, and wish to include in this definition, any non-coal chemical refining process which treats aromatic hydrocarbons containing heat-polymerizable components.

In hydro-upgrading processes, impurities are converted into compounds which can be separated readily from benzene, toluene and xylene by subsequent operations such as condensation, stripping, fractional distillation, azeotropic distillation, solvent extraction or combinations thereof. Hydro-upgrading processes are usually performed at temperatures which may range from 190° C. to 680° C.

Under pressure, and with increasing temperature, unsaturated compounds such as styrene tend to polymerize in the form of tarry compounds which are soluble in liquid phase in the aromatic feed stock. This solubility is unlimited. When the feed stock containing these polymers is exposed to a hot surface, such as that of a heat exchanger or heater, the polymer deposits on the hot surface and tends to build up in an increasingly thicker and harder layer, thus decreasing considerably the heat transfer to the feedstock, and requiring costly maintenance work in the operation of the heat exchanger.

The polymerization reaction also occurs in vapor phase when the vapors of an aromatic feed stock containing polymerizable impurities are exposed to hot surfaces, resulting in the fouling of these surfaces.

In addition, polymerized impurities of the feed stock form excessive coke on many hydro-upgrading catalysts. The rate of polymer formation is considerably greater in liquid phase, or in mixed phase, than in dry gas phase.

Certain hydro-upgrading processes, described in the art, have considered the use of a preliminary catalytic reactor, usually referred to as a treater, pretreater or guard case, ahead of the main catalytic reactor in order to selectively convert polymer-formers to non-polymerizable compounds at a relatively low temperature. Following this preliminary treatment, the feed vapors can be further heated with safety to the higher temperature of the main hydro-upgrading reactor. Although this method eliminates polymerization troubles above the operating temperature of the pretreater, it does not eliminate these troubles in the temperature interval between the vaporization temperature of the feed and the operating temperature of the pretreater.

Polymers form in the vaporizer at the temperature used to vaporize the feed stock, and these polymers dissolve in the boiling feed stock at the bottom of the vaporizer, and make up what is known as vaporizer bottoms. Portions of the vaporizer bottoms can be drawn off in order to reduce the amount of polymer in the vaporizer. This withdrawal results in the loss of a certain amount of feed. Part of this feed can be recovered upon separation from the polymer, by, for example, steam distillation, and can be recycled to the crude feed stock stream prior to the vaporizer. One way of decreasing the amount of feed withdrawal with the vaporizer bottoms is to increase the polymer concentration in the vaporizer. The vaporizer can be operated with polymer concentration as high as 50 or 60% by volume. In this type of operation only 0.1 to 0.2% by volume of the feed is withdrawn with the polymer. However, there is the possibility that some polymer may leave the vaporizer by entrainment with the volatilized feed.

It is an object of this invention to provide a method of vaporizing and pretreating an aromatic hydrocarbon feed stock containing polymerizable compounds such as styrene, indene, etc. whereby the polymer-formers are rendered nonpolymerizable and innocuous in a hydro-upgrading system.

Summary of the invention

I have found that aromatic hydrocarbon feed stock containing polymerizable compounds can be vaporized without polymer formation when mixed, as an unpreheated liquid, with sufficient preheated hydrogen in the presence of a hydrogenation catalyst to produce a dry hydrogen-vapor mixture and immediately thereafter reacted over the catalyst to convert polymer-formers into non-polymerizable compounds.

Essentially, in my process, unpreheated feed stock such as crude light oil is blended with a stream of preheated hydrogen gas and immediately thereafter introduced into a pretreated. The gas stream must be preheated to a temperature such that the resulting mixture of feed stock vapors and hydrogen gas is well above its dew point. Vaporization should take place inside the pretreater, and in the presence of a hydrogenation catalyst. Polymer-formers are vaporized to a dry state before they can polymerize. The mixture of hydrogen gas and feed stock vapors contacts and proceeds through the bed of hydrogenation catalyst within a controlled temperature range where the vapors of polymer-formers are converted to non-polymerizable compounds. The thus treated stream of feed stock vapors and hydrogen gas is withdrawn from the pretreater and is in condition for any subsequent hydro-upgrading step. During further heating and subsequent hydro-upgrading there is no risk of polymer formation.

Brief description of the drawings

In the accompanying drawings.

Detailed description

Figure 1:
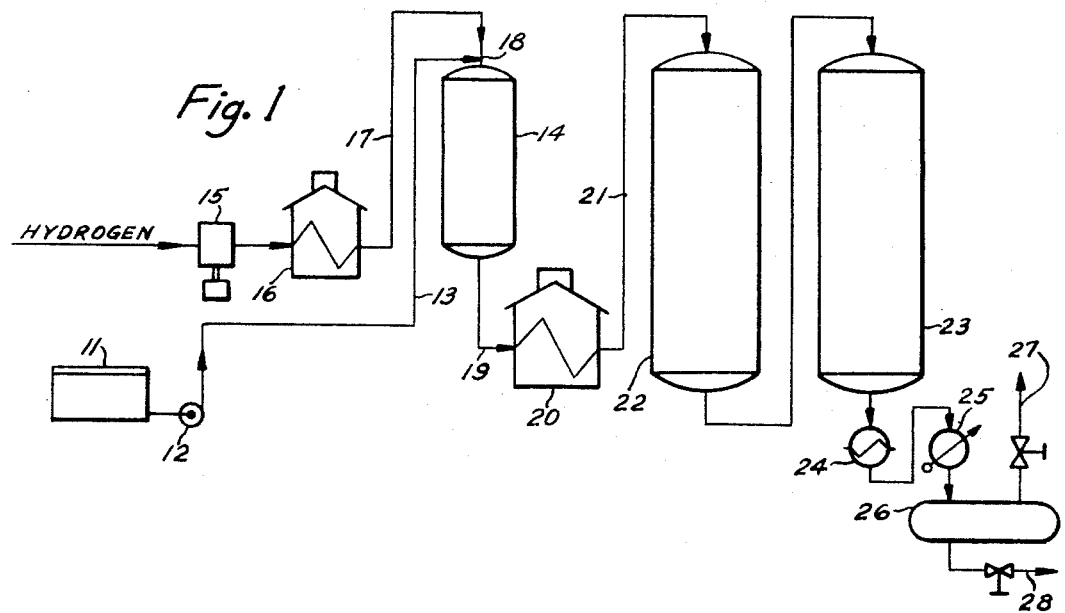
FIGURE 1 is a schematic representation of a preferred mode by which the invention can be performed.

Referring to FIGURE 1, forerun-free secondary light oil (boiling in the range of about 80°–155° C.) obtained from coal carbonization, and containing benzene, toluene, xylenes, heavier benzene homologs, and impurities, said impurities including styrene, indene, etc., is pumped from storage tank 11 by means of pump 12, at a pressure of about 60 atmospheres, through line 13 to vaporizer-pretreater vessel 14. Fresh and recycle hydrogen gas, corresponding to a hydrogen-to-light oil mol ratio of 5, is pressurized to 60 atmospheres by compressor 15, heated to 350° C. in direct-fired heater 16, and introduced into the vaporizer-pretreater via line 17. The hot hydrogen stream and the cold feed stock stream are joined at the junction 18 and the mixture introduced into the vaporizer-pretreater, in which vaporization and pretreatment occur in the presence of a fixed bed of commercially available cobalt-molybdate on alumina catalyst. In the presence of the catalyst at a temperature of from 230°–300° C., about 60 atmospheres pressure, and at a sufficiently high liquid hourly space velocity (of the order of 4–12 L.H.S.V.), styrene in the feed vapors is converted to ethyl benzene and other polymerizable impurities which may be present are converted to non-polymerizable compounds as well. The aromatic nuclei are not hydrogenated.

The gaseous effluent, which leaves vessel 14 line 19 free of polymerizable compounds, but still containing the values of the polymer formers in converted, innocuous and recoverable form, is now in condition for the subsequent hydro-upgrading steps, which, in this example, comprise removal of remaining impurities of the effluent light oil vapors, such as thiophenes and dealkylation of the benzene homologs, principally toluene.

While the remaining specifically described steps of this example, which deal with treatment of the effluent after it leaves vessel 14, are not part of this invention, the description is given here to show the important relationship of the invention to the development of a continuous process, in combination with a subsequent hydro-upgrading step.

Accordingly, effluent from pretreater 14 enters direct-fired heater 20 from line 19, where the temperature of the effluent is brought to about 600° C. The heated vapors are set by way of line 21 to hydrogenating reactors 22 and 23 where the temperature is maintained at between 600° C. and 640° C. and the pressure is maintained at approximately 60 atmospheres. In reactors 22 and 23, the light oil vapors are contacted with a chromia-alumina catalyst where sulfur compounds are converted to hydrogen sulfide, and toluene, xylene and heavier benzene homologs are partially dealkylated to less alkylated aromatics and benzene.

Upon leaving reactor 23, the effluent is cooled in one or several heat exchangers 24 and a final cooler condenser 25. The liquid condensate and uncondensed vapors are transferred from the condenser to flash drum 26, where the condensate is separated from the vapors which still contain considerable hydrogen. The vapors leave the drum through line 27 and are desulfurized and further processed for hydrogen purification by any commonly known method. The liquid condensate leaves the flash drum 26 through line 28, and is further processed at lower pressure in a stripper (not shown) to desorb the gases which are dissolved in the liquid condensate at the pressure of the flash drum. The liquid condensate is further treated in a clay treater (not shown) to remove the last traces of olefins, and in conventional fractional distillation equipment to separate pure benzene, toluene, xylenes and a heavier aromatic fraction from each other.

In the process just described, polymerization does not take place at any point in the system. Due to the fact that the liquid light oil feed is vaporized to a dry state and pretreated immediately after being brought into contact with the hot hydrogen gas, there is no opportunity for the polymerization reaction to occur. Therefore, the problems of vaporizing a hydrocarbon feedstock in the presence of a soluble polymer, that of polymer entrainment into the pretreater, and the consequent problem of polymer disposal, are effectively solved. The conventional vaporizer vessel, which is a major piece of equipment, can be eliminated. Polymerizable compounds in the feed are converted to useful products in practically quantitative amounts, and these converted products, which include ethylbenzene, can be converted to additional benzene in the subsequent hydro-upgrading step.

In this invention, the entire gaseous effluent from the pretreater, including treated feed stock and excess hydrogen, can be transferred in the vapor state to a subsequent hydro-upgrading step.

Figure 2:
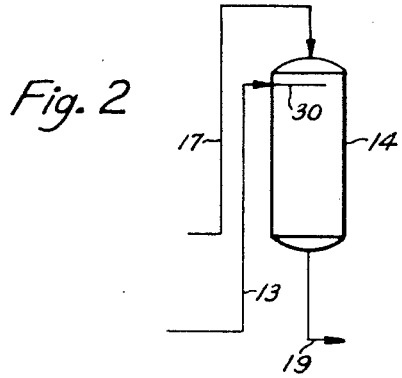
FIGURE 2 is a modification of FIGURE 1.

A modification of my process, shown in FIGURE 2, embraces separate inlets for introduction of the hot hydrogen and the unpreheated liquid feed into the vaporizer-pretreater 14. In large capacity installatioins, it may be preferable to use a more efficient liquid distribution system at the upper part of the pretreat catalyst bed. In FIGURE 2, fresh and recycle hydrogen gas, pressurized and preheated exactly as shown in FIGURE 1 of the preceding example, is introduced into the vaporizer-pretreater 14 from line 17. Forerun-free crude secondary light oil is pumped from the storage tank as in the previous example, and enters vaporizer-pretreater 14 via line 13 and distributor 30, installed at the inlet of vaporizer-pretreater 14. The liquid distributor 30 distributes the unpreheated liquid feed stock in the catalyst bed and into the path of incoming hot hydrogen gas, and insures admixture of hydrogen and feed and vaporization of the feed in the presence of the catalyst. Immediately following vaporization of the feed to dry vapors, said vapors are reacted in the presence of the catalyst. Effluent from the pretreater, withdrawn at line 19, is then heated and sent to the hydro-upgrading reactors as described in the previous example and shown in FIGURE 1.

While a high temperature, medium pressure, catalytic hydro-upgrading process, using a chromia-alumina catalyst, has been included in the description of the preferred mode by which my invention can be performed, the invention is not limited to combination with any specific hydro-upgrading process. The invention can be applied to any hydro-upgrading process operating substantially above 260 C. in the main reactors with chromia-alumina or other catalysts.

Operating characteristics for my process may vary somewhat, depending on the type of upgrading method used. For example, the lower the pressure in the hydro-upgrading process, and consequently in the vaporizer-pretreater, the lower will be the dew point of light oil vapors in the vaporizer-pretreater, and thus, the lower will be the required amount and temperature of the hot hydrogen gas. The hot hydrogen gas, as heating medium for the liquid feed should have a temperature between about 250° and 700° C.

While in the preferred example, the operating pressure and the operating temperature in the hydro-upgrading reactors have been given as 60 atmospheres and 600° to 640° C., respectively, substantially higher or lower pressures and temperatures may be used, when such change is dictated by the specific nature of the feed and the hydro-upgrading process used. In addition, the hydrogen-to-light oil mol ratio may also be varied within a relatively wide range, provided said ratio remains above the said allowable minimum as determined by the process pressure. The desirable mol ratio range of hydrogen to feed stock for a crude light oil feed will be between about 2.5:1 and 10:1. A satisfactory temperature range for the pretreater is between 180° and 400° C., while the pressure may range from 20 to 100 atmospheres. It should be noted that the pressure, except for unavoidable pressure drop, will, in a closed, continuous system, be approximately the same in both the pretreater and the subsequent hydro-upgrading steps.

For the reaction in the vaporizer-pretreater, a cobalt-molybdate on alumina catalyst is preferred, but other catalysts having an alumina or other carrier, for example nickel-molybdate, nickel-tungstate, oxides or sulfides of nickel, tungsten or molybdenum, barium oxide-promoted copper chromite, or platinum may be used for certain feed stocks.

My invention can be used as a pretreatment step prior to any form of hydro-upgrading of aromatic hydrocarbons, wherein undesirable polymers or resins would be formed by heat polymerization of styrene-type compounds, which, in addition to styrene, may include indene, coumarone and conjugated diolefins. Cyclopentadiene is an example of a diolefin which might be present as impurity in the aromatic hydrocarbons.

The type of feed stock which is applicable to my invention includes, in addition to forerun-free secondary light oil, total light oil, or crude fractions thereof, depending on the capabilities and requirements of the hydro-upgrading process. The invention may also be used as a pretreatment step in the refining of non-coal chemical feed stocks which may contain styrene, indene, coumarone, cyclopentadiene, dicyclopentadiene, isoprene, butadiene or dimethylbutadiene, and of by-products of ethylene manufacture which have polymerization problems similar to those encountered in the processing of light oils originating from the carbonization of coal.

In the foregoing description and appended claims, unpreheated liquid feed stock refers to feed stock which is below that temperature at which there would be any significant formation of polymers.

I claim:

1. A process for treating unpreheated liquid aromatic hydrocarbon feed stock containing polymerizable impurities which comprises completely vaporizing said feed stock by admixture with hot hydrogen in the presence of a hydrogenation catalyst in a reaction zone, reacting the polymerizable impurities of the feed stock in said reaction zone in the presence of said catalyst at a temperature between about 180° C. and 400° C. and thereby converting said impurities to a non-polymerizable form, and removing the treated feed stock and excess hydrogen as gaseous effluent from said reaction zone.

2. A process according to claim 1 in which the vapor mixture of hydrogen and feed stock is formed at a pressure between about 20 and 100 atmospheres.

3. A process according to claim 2 in which the hot hydrogen is at a temperature of from about 250° C. to 700° C.

4. A process according to claim 3 in which the catalyst is a supported cobalt-molybdate.

5. A process according to claim 4 in which the feed stock is a crude light oil from the carbonization of coal.

6. A process according to claim 3 in which the polymerizable impurities include at least one member of the group consisting of styrene, indene, coumarone, cyclopentadiene, dicyclopentadiene, isoprene, butadiene and dimethylbutadiene.

7. A process according to claim 4 in which the feed stock is a by-product of ethylene manufacture.

8. A process according to claim 5 in which the hydrogen-to-feed stock mol ratio is between 2.5:1 and 10:1.

References Cited

UNITED STATES PATENTS

| | | | |
|---|---|---|---|
| 3,081,259 | 3/1963 | Donovan et al. | 208—216 |
| 3,094,481 | 6/1963 | Butler et al. | 208—255 |
| 3,207,802 | 9/1965 | Maerker et al. | 260—674 |
| 3,260,765 | 7/1966 | Asselin | 260—672 |
| 3,222,410 | 12/1965 | Swanson | 260—672 |
| 3,201,488 | 8/1965 | Sherk et al. | 260—672 |
| 3,400,168 | 9/1968 | Fukuda et al. | 260—672 |
| 3,215,618 | 11/1965 | Watkins | 208—143 |
| 3,296,120 | 1/1967 | Doelp et al. | 208—143 |
| 3,394,199 | 7/1968 | Eng et al. | 260—674 |

DELBERT E. GANTZ, *Primary Examiner.*

G. E. SCHMITKONS, *Assistant Examiner.*

U.S. Cl. X.R.

208—48, 57, 89, 99, 143, 210, 674; 260—672